(12) United States Patent
You et al.

(10) Patent No.: US 12,400,376 B2
(45) Date of Patent: Aug. 26, 2025

(54) LIGHT SCREEN DEVICE, LIGHTING-EFFECT GENERATING METHOD AND DEVICE THEREOF, AND STORAGE MEDIUM

(71) Applicant: Shenzhen Intellirocks Tech. Co., Ltd., Shenzhen (CN)

(72) Inventors: Jie You, Shenzhen (CN); Wenlong Wu, Shenzhen (CN)

(73) Assignee: Shenzhen Intellirocks Tech. Co., Ltd., Shenzhen (CN)

( * ) Notice: Subject to any disclaimer, the term of this patent is extended or adjusted under 35 U.S.C. 154(b) by 0 days.

(21) Appl. No.: 18/968,248

(22) Filed: Dec. 4, 2024

(65) Prior Publication Data
US 2025/0200834 A1    Jun. 19, 2025

(30) Foreign Application Priority Data

Dec. 18, 2023  (CN) .......................... 202311741716.2

(51) Int. Cl.
| | | |
|---|---|---|
| G06T 11/00 | (2006.01) | |
| G06F 40/40 | (2020.01) | |
| G06T 7/11 | (2017.01) | |
| G06T 7/90 | (2017.01) | |
| G06V 20/70 | (2022.01) | |
| G09G 5/02 | (2006.01) | |

(52) U.S. Cl.
CPC ............ *G06T 11/001* (2013.01); *G06F 40/40* (2020.01); *G06T 7/11* (2017.01); *G06T 7/90* (2017.01); *G06V 20/70* (2022.01); *G09G 5/02* (2013.01); *G06T 2207/10024* (2013.01); *G06T 2207/20021* (2013.01)

(58) Field of Classification Search
None
See application file for complete search history.

(56) References Cited

U.S. PATENT DOCUMENTS

| | | | |
|---|---|---|---|
| 2017/0270896 A1* | 9/2017 | Cope ........................ | G09G 5/02 |
| 2023/0090253 A1* | 3/2023 | Meadows ............... | H04L 67/12 |
| | | | 345/419 |
| 2024/0095926 A1* | 3/2024 | Choi ........................ | G06T 7/246 |
| 2024/0127563 A1* | 4/2024 | Koujan ................... | G06T 11/00 |
| 2024/0135621 A1* | 4/2024 | Sang ..................... | G06V 10/751 |

FOREIGN PATENT DOCUMENTS

CN          102737391 A          10/2012

* cited by examiner

*Primary Examiner* — James A Thompson
(74) *Attorney, Agent, or Firm* — Wenye Tan

(57) ABSTRACT

A lighting-effect generating method is provided for a light screen device. The method includes: obtaining stylized image material after a lighting-effect generation model transforms image media material according to a transformation prompt text, where the stylized image material including at least one stylized image; generating lighting-effect control data matching a target light screen according to the stylized image in the stylized image material; and controlling the target light screen to play a corresponding lighting effect according to the lighting-effect control data.

20 Claims, 3 Drawing Sheets

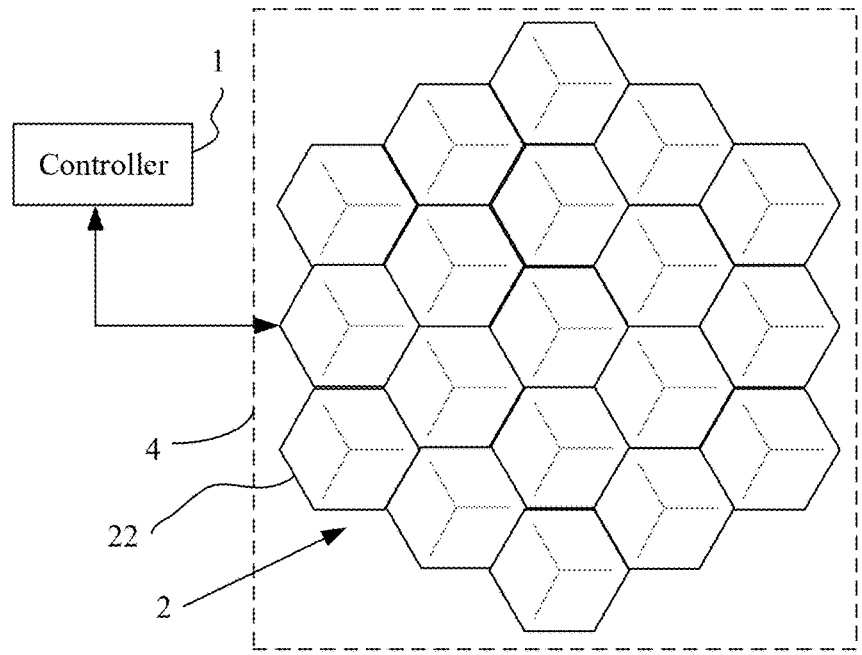

FIG. 3

```
┌─────────────────────────────────────────────────────────────────────┐
│ Obtaining a stylized image material after an image media material   │  S5100
│ is transformed by a lighting-effect generation model according to a │
│ transformation prompt text, where the stylized image material       │
│ includes at least one stylized picture                              │
└─────────────────────────────────────────────────────────────────────┘
                                  ↓
┌─────────────────────────────────────────────────────────────────────┐
│ Generating lighting-effect control data matching the target light   │  S5200
│ screen according to the stylized pictures in the stylized image     │
│ material                                                            │
└─────────────────────────────────────────────────────────────────────┘
                                  ↓
┌─────────────────────────────────────────────────────────────────────┐
│ Controlling the target light screen to play the corresponding       │  S5300
│ lighting effect according to the lighting-effect control data       │
└─────────────────────────────────────────────────────────────────────┘
```

FIG. 4

LIGHT SCREEN DEVICE, LIGHTING-EFFECT GENERATING METHOD AND DEVICE THEREOF, AND STORAGE MEDIUM

CROSS-REFERENCES TO RELATED APPLICATIONS

This application claims priority to Chinese Patent Application No. CN2023117417162, filed on Dec. 18, 2023, the content of which is hereby incorporated by reference in entirety.

FIELD OF THE TECHNOLOGY

The present disclosure relates to the technical field of lighting technology and, specifically, to a light screen device, lighting-effect generating method and device thereof, and storage medium.

BACKGROUND OF THE DISCLOSURE

With the improvement of people's income levels, light screen devices are becoming more and more popular. As a kind of intelligent lamp, a light screen device can play a role in decorating indoor space and displaying information. The characteristic of the light screen device is that it uses lamp beads with relatively large visual granularity as basic pixels, and the light screen device can be manifested in various forms of products through different implementation methods of its light screen, such as a curtain lamp, a pixel screen, a splicing lamp, etc. One of the functions of light screen device is to generate corresponding lighting effects according to a given reference image.

Under traditional technologies, the reference image used by light screen device to generate lighting effects is generally a high-definition image, which needs to undergo more complex post-processing to adapt to each pixel on the light screen in the light screen device for display. In addition, due to the large difference between resolutions of the high-definition image and light screen pixel, it is also difficult for users to predict the lighting effect that can be obtained from a reference image, which often brings many inconveniences to the customization of lighting effects, including the generation, selection, and editing of reference images by the user using the light screen device, causing difficulties to get a good product experience. In particular, the inconvenience in the generation stage can lead to low ability and efficiency for the user to innovate lighting effects, which hinders further popularization of light screen devices. Thus, it can be seen that traditional light screen devices often perform poorly in terms of content customization of lighting effects, which affects the promotion of light screen devices. It is desired to upgrade the existing technology of light screen devices.

The disclosed methods and apparatus are directed to solve one or more problems set forth above and other problems.

SUMMARY

Embodiments of the present disclosure provides a light screen device, lighting-effect generating method and device thereof, and storage medium.

According to one aspect of the present disclosure, a lighting-effect generating method is provided for a light screen device. The method includes: obtaining stylized image material after a lighting-effect generation model transforms image media material according to a transformation prompt text, where the stylized image material including at least one stylized image; generating lighting-effect control data matching a target light screen according to the stylized image in the stylized image material; and controlling the target light screen to play a corresponding lighting effect according to the lighting-effect control data.

According to another aspect of the present disclosure, a light screen device is provided. The light screen device includes a central processing unit, and a memory. The central processing unit is configured to execute a computer program stored in the memory to perform a lighting-effect generating method. The method includes: obtaining stylized image material after a lighting-effect generation model transforms image media material according to a transformation prompt text, where the stylized image material including at least one stylized image; generating lighting-effect control data matching a target light screen according to the stylized image in the stylized image material; and controlling the target light screen to play a corresponding lighting effect according to the lighting-effect control data.

According to another aspect of the present application, a non-transitory computer-readable storage medium is provided. The non-transitory computer-readable storage medium stores a computer program including computer-readable instructions for, when executed a computer, performing a lighting-effect generating method for a light screen device. The method includes: obtaining stylized image material after a lighting-effect generation model transforms image media material according to a transformation prompt text, where the stylized image material including at least one stylized image; generating lighting-effect control data matching a target light screen according to the stylized image in the stylized image material; and controlling the target light screen to play a corresponding lighting effect according to the lighting-effect control data.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

FIG. 3 illustrates another structural diagram of a light screen device in a form of a splicing lamp according to an embodiment of the present disclosure;

FIG. 4 illustrates a flow chart of a lighting-effect generating method according to an embodiment of the present disclosure;

DETAILED DESCRIPTION

Figure 1:
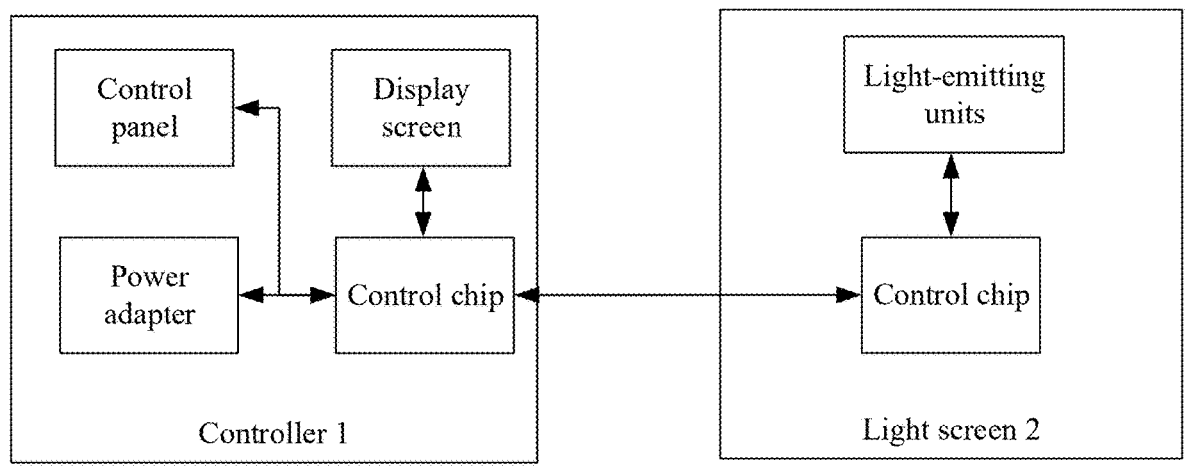
FIG. 1 illustrates a schematic diagram of an electrical structure of a light screen device according to an embodiment of the present disclosure.

FIG. 1 illustrates a schematic diagram of an electrical structure of a light screen device according to an embodiment of the present disclosure. As shown in FIG. 1, the light screen device may include a controller 1 and a light screen 2, etc. The light screen 2 is electrically connected to the controller 1 so as to accept the control of the computer program running in the controller 1 and to collaborate together to realize the lighting-effect playback of the light screen device.

The controller 1 generally includes a control chip, a communication component, and a bus connector. In some embodiments, the controller 1 can also be configured with a power adapter, a control panel, and a display screen, etc., as needed.

The power adapter is mainly used to convert the mains power into direct current to power the entire light screen device. The control chip of the controller can be implemented by various embedded chips, such as Bluetooth SoC (System on Chip), WiFi SoC, DSP (Digital Signal Processing), MCU (Micro Controller Unit, commonly known as single-chip microcomputer) and other types of chips. The control chip usually includes a central processing unit and a memory. The memory and the central processing unit are used to store and execute program instructions respectively to realize corresponding functions.

The above various types of control chips can have their own communication components, or they can be additionally configured with a communication component as needed. The communication component can be used to communicate with external devices, for example, it can communicate with terminal devices such as personal computers or various smart phones, so that after the user issues various configuration instructions through a terminal device, the control chip of the controller 1 can receive the configuration instructions through the communication component to complete the basic configuration so as to control the operation of the light screen 2. In addition, the controller 1 can also obtain the lighting-effect application package encapsulating multiple lighting effect layers through the communication component.

The bus connector is mainly used to connect the power supply to the light screen 2 connected to the bus and to provide lighting-effect playback instructions, so the corresponding pins of the power bus and the signal bus are provided. Thus, when the light screen 2 needs to be connected to the controller 1, it can be realized by connecting the corresponding connector of the light screen to the bus connector. The control panel usually provides one or more buttons for implementing switch control of the controller 1, and selecting various preset lighting effect control formats, etc. The display screen can be used to display various control status information, so as to cooperate with the buttons in the control panel to support the realization of human-computer interaction functions. In some embodiments, the control panel and the display screen can be integrated into a same touch screen.

The specific form of the light screen can be designed according to actual conditions. For example, the light screen device can be designed as a curtain lamp, a pixel screen, or a splicing lamp, etc.

Figure 2:
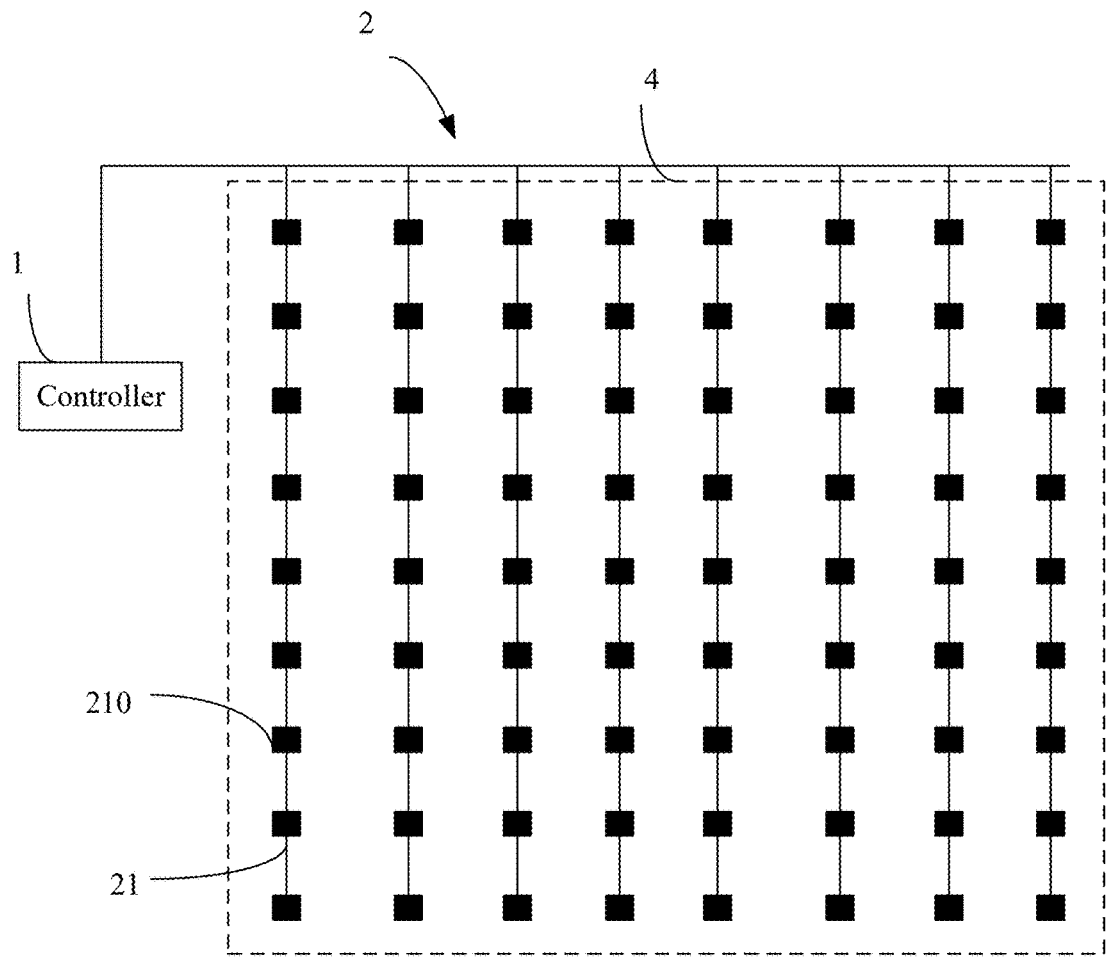
FIG. 2 illustrates a structural diagram of a light screen device in a form of a curtain lamp according to an embodiment of the present disclosure.

For example, as shown in FIG. 2, the light screen device is arranged in the form of a curtain lamp. The light screen 2 includes a plurality of light strips 21 connected to a bus. Each light strip 21 includes a plurality of lamp beads 210 connected in series. Each lamp bead 210 serves as a light-emitting unit. In addition, each light strip 21 usually has the same number of lamp beads 210, arranged at equal intervals. When the light screen 2 used as a curtain lamp, each light strip 21 is usually unfolded according to the layout shown in FIG. 2, so that all the lamp beads in all the light strips 21 are arranged in an array to form a lamp bead matrix structure. Since all the lamp beads can provide a frame effect when they emit light in coordination, the surface where the entire lamp bead matrix structure is located constitutes a display frame 4. When the lighting effect is played, a certain pattern effect can be formed within the display frame 4.

Each light strip 21 can be composed of a plurality of lamp beads 210 connected in series, each lamp bead 210 is a light-emitting unit, and each lamp bead 210 in the same light strip 21 is provided with operational electrical current through the same set of cables connected to the bus. The lamp beads 210 in the same light strip 21 can also be connected in parallel in terms of electrical connection. In one embodiment, each light strip 21 in the same lamp bead matrix structure can be arranged at equal intervals along the bus direction, and the lamp beads 210 in each light strip 21 are also arranged in a corresponding manner in terms of number and position. In this way, the entire display frame 4 plays a role similar to a display screen when viewing its lighting effect from a distance, and can form a picture effect in human eyes.

In each lamp bead 210 of each light strip 21 of the light screen 2, a corresponding control chip is also provided. The control chip can be selected according to the above disclosure, or other more economical control chips can be selected. Its main function is to extract the light color value corresponding to the lamp bead 210 from the lighting-effect playback instruction, and control the light-emitting element in the lamp bead 210 to emit the corresponding color light. The light-emitting element can be an LED lamp.

The implementation principle of the pixel screen is basically the same as the implementation principle of the curtain lamp above, but the pixel screen may provide a physical frame for fixing each light-emitting unit, and arrange each light-emitting unit in the same rectangular frame in a row and column matrix, so as to obtain a product form effect that is more similar to an ordinary display screen. The pixel screen is similar to the curtain lamp, each light-emitting unit can be arranged according to a structure in which multiple light strips are arranged side by side, and can be controlled by the same control method as the curtain lamp, details of which are not repeated here.

FIG. 3 illustrates another form of the light screen in the light screen device of the present disclosure, which is essentially a splicing lamp, and the light screen 2 in the splicing lamp is composed of one or more lamp blocks 22. The lamp block 22 of the splicing lamp includes multiple light-emitting units (not shown) that are standardized and set at different positions of the lamp block. Each light-emitting unit can also be provided with a corresponding light-emitting control chip to parse the corresponding control data and generate a corresponding light-emitting control signal. The light-emitting control signal controls the light-emitting element in the corresponding light-emitting unit to emit light according to a specific light-emitting color value. As a whole, the lamp block can also be provided with an independent control chip as a control unit to control the light emission of all the light-emitting units in the lamp block. This independent control unit can transmit the corresponding timing control data to the control chip of each light-emitting unit to achieve the purpose of centralized control. Of course, the entire lamp block can also be directly controlled by a single control chip to achieve the purpose of corresponding lighting-effect playback. This can be designed flexibly according to the capabilities of the control chip used in the lamp block and its light-emitting units, and does not affect the creative spirit of embodiments of the present disclosure. Accordingly, for a lamp block, all its light-emitting units can be uniformly controlled to emit light at the same time, or the control granularity can be specific to each light-emitting unit. The finer the control granularity, the finer the generated lighting effect.

Lamp blocks 22 of different lamp block forms can be spliced together with each other. For example, a quadrilateral lamp block is adjacent to any structural edge of the outer periphery of a hexagonal lamp block. It is not difficult to understand that by matching lamp blocks of different lamp block forms, a richer array pattern can be constructed. When it is to control each lamp block to play the corresponding lighting effect, the display frame 4 can be presented by coordinating and controlling each light-emitting unit of each lamp block to emit light, showing the corresponding lighting effect.

In the light screen device of the present disclosure, when it is powered on, the control chip of the controller can call and execute a computer program from the memory, and through the default initialization process of the computer program, the light screen is powered on and initialized, and the drive configuration of the light screen and other hardware devices is completed.

In one embodiment, when the controller starts the light screen, the controller can first send a self-test instruction to the light screen to drive each light strip of the light screen or each lamp bead in the lamp block to return its position information in the light strip or the lamp block. Each lamp bead is provided with a corresponding control chip for data communication with the control chip in the controller, so that the characteristic information of the lamp bead itself can be serially arranged with the characteristic information of other lamp beads in sequence according to a serial communication protocol to realize the characterization of its own position information. The serial communication protocol executed between the controller and the lamp bead can be any one of IIC (Inter-Integrated Circuit), SPI (serial peripheral interface), and UART (Universal Asynchronous Receiver-Transmitter). After the controller obtains the result data returned by the self-test of each lamp bead from the bus, the controller can parse the result data and, according to the order of the characteristic information of each lamp bead in the result data, determine the position of each lamp bead in the display frame 4 presented by the entire light screen. Therefore, each lamp bead can be regarded as a light-emitting unit, which can be understood as a basic pixel. The position information of each lamp bead can be constructed as the light source position distribution information. When constructing the lighting-effect control data, the controller can set the corresponding light color value for each basic pixel according to the position information of each lamp bead, that is, each light-emitting unit in the light source position distribution information, according to actual needs.

In some embodiments, the controller 1 of the present disclosure can be implemented in an independent computer device, as long as the computer device is equipped with the corresponding hardware of the controller 1, and the corresponding business logic of the controller 1, including the business logic executed by methods of the present disclosure, is implemented as a computer program installed in the computer device for operation. When the controller 1 is implemented in a computer device, various resources inherent to the computer device can be shared to save the overall implementation cost. The computer device referred to here can be any terminal device for users, such as a smart phone, a personal computer, a laptop computer, or a tablet computer, etc.

According to the product architecture and operational principle of the above light screen device, the lighting-effect generating method of the present disclosure can be implemented as a computer program product, stored in the memory of the controller of the light screen device, and called from the memory by the central processing unit and run, thereby controlling the light screen to play the corresponding lighting effect.

FIG. 4 illustrates a flow chart of a lighting-effect generating method according to an embodiment of the present disclosure. The lighting-effect generating method of the present disclosure can be deployed in a terminal device and/or a controller in a distributed manner or a centralized manner as needed to run the various processes. As shown in FIG. 4, the lighting-effect generating method may include the following.

Step S5100, obtaining a stylized image material after an image media material is transformed by a lighting-effect generation model according to a transformation prompt text, where the stylized image material includes at least one stylized image or picture.

According to the present disclosure, a lighting-effect generation model may be prepared in advance, which may be a deep learning model, and can be implemented based on a large language model or based on self-construction. The lighting-effect generation model can accept input of two types of information, where the two types of materials include the transformation prompt text and image media materials, with the help of a text editor and an image editor, which respectively edit the transformation prompt text and the image media material to obtain their respective text encoding information and image encoding information, and then perform reasoning based on the image encoding information and the text encoding information to obtain corresponding image data. Depending on the network architecture built by the lighting-effect generation model and its ability to adapt to training, the image data can be one or more stylized images, or one or more model output images. For the model output images, a transformation processing business logic can be connected to further transform them into corresponding stylized images. In short, with the help of the ability of the lighting-effect generation model, the image media material can be transformed into stylized image material composed of one or more stylized images.

The lighting-effect generation model can be deployed in a cloud server, a terminal device, or the controller of the light screen device, as long as the computing power of the deployed end is capable of meeting the operation requirements of the lighting-effect generation model. Correspondingly, the controller of the present disclosure can receive the stylized image material finally obtained after the transformation and processing of the lighting-effect generation model to play the corresponding lighting effect. The process of calling the lighting-effect generation model to generate stylized image materials can also be flexibly implemented in the cloud server, terminal device, or the controller according to the computing power and functional requirements.

The image media material can be image data of various formats containing image information, and the image data can be pictures of various formats, videos of various formats, or various video streams transmitted by streaming media, such as live video streams, video streams formed by continuous screenshots of the interface image of the graphical user interface, etc. In any case, the image media material contains one or more pictures, and for videos, it refers to the image frames therein. The image media material plays the role of providing basic image data for the lighting-effect generation model, so that the lighting-effect generation model can perform appropriate transformations on the basis of these basic image data to create new image content, and finally enable the controller to obtain stylized image materials prepared according to these image contents.

The transformation prompt text can be text expressed in natural language, which can be inputted in any form and converted as needed. For example, the user can input the corresponding natural language text through an input method, or the user can input it in the form of voice and convert the voice into the corresponding natural language text. For the natural language text originally inputted by the user, text formatting preprocessing can be performed as needed, such as correcting typos, removing invalid characters, etc. The transformation prompt text usually plays the role of an instruction representation. In the transformation prompt text, instructions for performing various forms of transformations on the images in the image media material can be given, so that the lighting-effect generation model can generate image data with different contents, different styles, and different information from the original image according to the instructions. Of course, the transformation prompt text can also provide instruction information such as target resolution and target size regarding the size specifications of the image data outputted by the lighting-effect generation model.

When the image media material and the transformation prompt text are given and imported into the lighting-effect generation model, the lighting-effect generation model transforms each image or picture in the image media material according to the semantics of the transformation prompt text based on its reasoning ability acquired through training. After transformation on demand, the controller can finally obtain the corresponding stylized image material, and the stylized image material includes one or more stylized images obtained by stylizing one or more images in the image media material.

The stylized image material can be a file or data set obtained by encapsulating one or more stylized images into a specific data format for easy storage and calling back, as long as it can be parsed accordingly to extract the stylized images therein when used. Of course, the stylized image material can also be a logical collective definition of each stylized image called discretely.

Step S5200, generating lighting-effect control data matching the target light screen according to the stylized images in the stylized image material.

The controller in the light screen device can be connected to one or more light screens, and the light screen that needs to play the lighting effect is used as the target light screen, and each stylized image in the stylized image material can be converted into lighting-effect control data one by one, and transmitted to the target light screen as a lighting-effect playing instruction, so as to control the target light screen to play the corresponding lighting effect.

In one embodiment, the stylized image material is encapsulated with multiple stylized images in the format of video data or an image set, and the controller parses the stylized image material, extracts each stylized image therein, stores it in an image queue, and dequeues each stylized image one-by-one according to the first-in-first-out mechanism of the queue, and generates its corresponding lighting-effect control data according to the dequeued stylized images. Each lighting-effect control data generated by converting each stylized image one-by-one can be stored in a cache area for cyclic call to realize cyclic playback of the lighting effects corresponding to each stylized image. In an embodiment where the stylized image material has only a single stylized image, the lighting-effect control data can be directly generated based on the stylized image for playback and storage for reuse without relying on the image queue.

When to generate lighting-effect control data, the frame information of the display frame of the target light screen can be obtained in advance to determine the display frame. In one embodiment, the frame information can be determined based on the light source position distribution information of the target light screen. The light source position distribution information gives the position information of each light-emitting unit in the target light screen relative to the display frame, and the position distribution relationship of the basic pixels of the target light screen is given, thereby actually determining the display frame of the target light screen.

Both the target light screen and the stylized image can be divided into multiple partitions or regions. It is not difficult to understand that, according to the relationship between the basic pixel distribution of the display frame of the target light screen and the resolution information of the stylized image, a partition mapping relationship between them can be established, so that partition mapping relationship between the pixels in the stylized image and the basic pixels of the display screen, that is, the light-emitting units, can be flexibly established in accordance with the proportional relationship of the pixel resolutions of each other in a many-to-one, many-to-many, one-to-many, one-to-one, or other manner. According to this partition mapping relationship, the image data of each partition on the stylized image can be mapped to the image data of the corresponding partition in the display frame, which is expressed in the lighting-effect control data, that is, the control data of each light-emitting unit in the corresponding partition. It can be seen that the corresponding lighting-effect control data can be generated according to the preset rules based on the stylized image.

In one embodiment, the pixel resolution of the stylized image can be completely consistent with the pixel resolution of the display frame. In this case, the pixels in the stylized image correspond to the light-emitting units in the display frame one-to-one, and the control data of the corresponding light-emitting units can be directly generated according to the image data of each pixel of the stylized image, thereby realizing the generation of lighting-effect control data between the stylized image and the display frame in a one-to-one partition mapping relationship.

In another embodiment, each image region is determined in the stylized image according to the construction manner of independent content objects. The edge contour of an image region is usually irregular, but it may also be regular. Then, according to the image region defined by this edge contour, the image region is scaled and mapped to the display frame according to the proportional relationship between the resolution of the stylized image and the display frame, so that the mapped area in the display frame can be determined, thereby determining each light-emitting unit in the mapped area, and the control data of these light-emitting units can be determined according to the image data in the image region, realizing the generation of lighting-effect control data in a many-to-many partition mapping relationship between the stylized image and the display frame.

In another embodiment, a many-to-many partition mapping relationship is also followed, but the image region is not determined by partitioning in the manner of each independent content object, but a regular division method is adopted to equally divide the stylized image to determine multiple image regions. Similar to the above description, the generation of lighting-effect control data in a many-to-many partition mapping relationship can also be realized.

In the process of partition mapping in the above embodiments to determine the control data of the corresponding light-emitting units according to the image data in the stylized image, the image data used is mainly color data, such as color value. Of course, according to the different ways of representing image information in different formats of image data and the different ways of controlling the target light screen, other image data such as brightness value and saturation may also be further included.

The lighting-effect control data generated according to the above various implementations is constructed correspondingly according to the display frame defined by the light source position distribution information of the target light screen. Therefore, the lighting-effect control data can match the target light screen. When it is transmitted to the target light screen, the target light screen can correctly parse and apply the lighting-effect control data without error.

Step S5300, controlling the target light screen to play the corresponding lighting effect according to the lighting-effect control data.

The lighting-effect control data corresponding to each stylized image can be transmitted to the target light screen one-by-one to control the target light screen to play the corresponding lighting effect. Specifically, in the case where there are multiple stylized images in the stylized image material and multiple lighting-effect control data are generated accordingly (e.g., multiple data packets or messages, each data packet contains lighting-effect control data for a stylized image), the controller can trigger the transmission of the lighting-effect control data to the target light screen at intervals according to the preset playback time slot, so that each lighting-effect control data corresponding to each stylized image is transmitted to the target light screen one-by-one in turn. Since the lighting-effect control data has been added to the cache area, in some embodiments, when playing the lighting effects corresponding to individual stylized images in turn to present the overall lighting effect, for the lighting-effect control data already stored in the cache area, it is no longer necessary to rely on the step of converting the stylized image in advance, and it is only necessary to reuse the already stored lighting-effect control data from the cache area for transmission and application.

Each time the target light screen receives the lighting-effect control data, it transmits the control data to each light-emitting unit according to the data communication protocol followed between the target light screen (i.e., the controller for the target light screen) and each light-emitting unit, such as the serial communication protocol. After each light-emitting unit receives the lighting-effect control data, it extracts or intercepts the control data corresponding to itself, controls its own light-emitting element to emit corresponding light according to its own control data, and forwards the lighting-effect control data to other light-emitting units that have not received the control data. Each light-emitting unit receives, analyzes, responds to and forwards the lighting-effect control data according to its inherent business logic, and the entire target light screen can present the picture effect of the stylized image corresponding to the lighting-effect control data, and the picture effect can naturally also approximately reproduce the stylized effect in the stylized image.

It is not difficult to understand that when the stylized image material contains multiple stylized images, the lighting effects corresponding to individual stylized images are presented in turn in the display frame of the target light screen, forming the same overall lighting effect with constantly changing pictures. When the stylized images in the stylized image material are pictures from the same theme or videos from the same theme content, the themed overall lighting effect can usually be presented on the target light screen. It is not difficult to understand that such an overall lighting effect has a consistent and dynamic style, and has a more immersive effect on the scene.

According to the above embodiments, the present disclosure has many advantages, including but not limited to the following.

First, in the present disclosure, after an image media material and a transformation prompt text are provided, the lighting-effect generation model transforms the given image media material according to the given transformation prompt text to obtain stylized image material, which contains at least one stylized image, and converts the stylized image into lighting-effect control data to control the target light screen to play the corresponding lighting effect. Therefore, with the ability of the lighting-effect generation model to create stylized images according to the transformation prompt text and image media material, the creation of lighting effects can be completed quickly, which improves the creation efficiency of customizing lighting effect content for the light screen, simplifies the complexity of customizing lighting effects, and can greatly improve the user's product experience of the light screen device.

Second, the lighting-effect generation model of the present disclosure uses image media material as basic data and transformation prompt text as a creation direction indicator. Under the guidance of the transformation prompt text, the lighting-effect generation model can generate output that meets the user's expectation based on the image media material, so that the user can finally obtain stylized image material. The user can flexibly provide various image media materials and set transformation prompt texts in combination with the image media materials and the user's own expectations. For example, different forms of image media materials such as pictures and videos can be provided, and then instructions can be inputted in the form of text, voice, etc., and converted into transformation prompt texts, which can guide the lighting-effect generation model to perform transformation processing and finally obtain stylized images in stylized image materials. As a result, it is easier for users to produce high-quality lighting effects.

In addition, the present disclosure uses the lighting-effect generation model to serve the lighting effect customization of the light screen device, realizes the technical upgrade of the light screen device, realizes the ability of the light screen device to intelligently generate lighting effects, and enriches the product functions of the light screen device in terms of content customization. Thus, the light screen device has a higher acceptance and is easier to popularize, and its potential economic benefits are significantly improved.

Based on embodiments of the above methods of the present disclosure, the process of obtaining a stylized image material after an image media material is transformed by a lighting-effect generation model according to a transformation prompt text may include the following.

Step S6100, obtaining the image media material and transformation prompt text specified by the user.

Both the image media material and the transformation prompt text can be specified by the user. For example, the user can select one or more pictures or videos from the local album of the terminal device as the image media materials. Of course, it is also possible to specify an online link to determine the corresponding picture or video as the image media material. The transformation prompt text can be manually entered and submitted by the user, or it can be set by default. When the user submits the image media material, the default transformation prompt text is called back as the input transformation prompt text. In one embodiment, multiple transformation prompt text templates for generating stylized images of various styles can be pre-customized, so that the user can select any one of them as the transformation prompt text for application.

Step S6200, importing the image media material and the transformation prompt text into the lighting-effect generation model to obtain the corresponding transformed image material, the transformed image material includes at least one model output image, and the lighting-effect generation model is a large language model fully trained by a third party.

The lighting-effect generation model, in one embodiment, is a large language model fully trained by a third party, which is based on the network architecture of the large language model and is trained with massive training data to enable it to generate corresponding images/pictures according to the input image information and text information. When the image media material and transformation prompt text specified by the user are submitted to the lighting-effect generation model, the lighting-effect generation model uses the reasoning ability obtained from its training, takes each picture in the image media material as a blueprint, and performs corresponding image content transformation processing on each picture according to the intention expressed by the natural language text in the transformation prompt text to obtain the corresponding image, which is called the model output image. The number of model output images generated by the lighting-effect generation model based on the image media material generally corresponds to the number of images in the image media material, and these model output images constitute the transformed image material generated by the lighting-effect generation model.

In some embodiments, by using the prompt text containing specific semantics in the transformation prompt text to instruct the lighting-effect generation model to generate the same model output image for highly similar pictures in the image media material, it can avoid the lighting-effect generation model from generating a model output image corresponding to each picture in the image media material one-by-one, which not only can improve the production efficiency of the lighting-effect generation model to generate all model output images, but also save system overhead and avoid duplication of lighting effects.

When using a third-party trained large language model to generate model output images, it may have cost-effectiveness, but because this large language model is in the scope of general artificial intelligence, the model output images it produces may not be highly matched to the requirements of playing back lighting effects, and may be unable to play the role of stylized images. In this case, each model output image can be further optimized through subsequent steps to obtain the corresponding stylized images.

Step S6300, taking the model output image in the transformed image material as a unit, stylizing each model output image to obtain a corresponding stylized image.

To ensure that the model output image can be used to efficiently play the lighting effect, it may stylize each model output image and, through the stylization process, convert each model output image into a stylized image that is more suitable for conversion into lighting-effect control data to control the target light screen to play the corresponding lighting effect.

With respect to the manner of stylizing the model output image, depending on the type of stylized effect, a corresponding algorithm can be designed and implemented as a corresponding program interface. When a certain type of stylized processing is required, the corresponding program interface is called to convert the model output image into the corresponding stylized image.

In one embodiment, the user can also include an instruction text corresponding to the stylized effect type in the transformation prompt text, which can prompt the lighting-effect generation model to generate a model output image that is as close to the target stylized effect as possible, and then further process it through this step. Of course, the instruction text indicating the type of stylized effect can also be determined by the business logic of the system by default, or set by the user. It is not difficult to understand that allowing users to participate in the specified stylized effect type can improve user participation and enhance user experience.

Step S6400, constructing each of the stylized images into a stylized image material for future call back.

After all the model output images in the transformed image material are converted into corresponding stylized images, all stylized images may be formed into an image set, or they are packaged into a file in a certain format to form a stylized image material, which can be used for transmission, storage, and call back. For example, it can be directly transmitted from the device where the lighting-effect generation model and the stylized processing program are deployed to the controller, or returned to the terminal device where the user is located, and the terminal device transmits it to the controller as needed.

According to the above embodiments, it is not difficult to understand that, by using a large language model that is fully trained by a third party or is off-the-shelf, the image content of the image media material can be transformed according to the transformation prompt text given by the user, so as to assist the user in completing the image content creation, and obtain one or more model output images to constitute the corresponding transformed image material. After stylizing each model output image in the transformed image material, each stylized image that is more suitable for playing the corresponding lighting effect can be obtained. These stylized images constitute stylized image materials, which can be stored and reused, and can also be used for direct playback of lighting effects. With the help of a large language model, the efficiency for users to create lighting effects is greatly improved, and because the image content can be diversified, the stylized image materials required for lighting effects are also richer, which can optimize the content customization architecture of the light screen device and help to promote and popularize the light screen device.

In the process of continuously transforming the model output images to obtain the stylized images, each model output image in the transformed image material can be pre-processed and then stylized. Based on embodiments of the above methods of the present disclosure, the model output image in the transformed image material is used as a unit, and each model output image is stylized to obtain a corresponding stylized image. The process may further include the following.

Step S7100, compressing each model output image in the transformed image material to a preset scale to obtain a standard image.

Each model output image in the transformed image material is generated by a lighting-effect generation model. For the purpose of content creation, when it fails to become a stylized image, it is essentially an intermediate product. Therefore, it generally has a higher resolution and needs to be subsequently transformed to obtain the final stylized image. Based on this, each model output image in the transformed image material is first compressed according to the preset scale to obtain a corresponding standard image.

The preset scale can be set to meet the needs of subsequent processes. For example, to meet the needs of input parameter constraints when performing target detection or image segmentation on the model output image, or just to meet the needs of normalization processing, a preset scale can be set accordingly. The preset scale is generally expressed in terms of resolution. For example, the resolution formed by the arrangement of the light-emitting units in the vertical and horizontal directions in the display frame of the target light screen is adapted to match the corresponding preset multiples to determine a resolution as the preset scale. For example, if the resolution formed by the light-emitting units in the display frame of the target light screen is 64*64, the corresponding preset scale can be determined as 128*128 or 256*256 according to 2 or 4 multiples. Of course, it can also be set according to any other multiples, as long as a certain ratio relationship between the preset scale and the display frame of the target light screen is maintained to ensure the corresponding mapping in the direction.

Step S7200, based on the standard image, determine multiple image regions in the standard image, where the image regions have regular or irregular edge contours.

In order to enable the target light screen to reproduce the image style of the model output image more precisely, the standard image can be further partitioned on the basis of the standard image obtained from the model output image to determine multiple image regions. According to different partitioning formats, each image region can be processed in a regular division manner to have a regular edge contour, or in an irregular division manner to have an irregular edge contour.

In one embodiment, target detection can be performed on the standard image to determine the windows of each target object in the standard image, and after deduplication of the overlapping parts of each window, each window with a clear boundary is obtained to specify each image region, so that each image region has a regular edge contour. For background parts that are not identified as target objects, they can be unified into the same image region. It is not difficult to understand that, in this case, the standard image is divided into blocks according to the content objects therein, and the boundaries of each block are relatively clear.

In another embodiment, on the basis of completing the target detection in the previous embodiment to obtain the windows of each target object, the image content corresponding to each window can be extracted for image semantic segmentation to obtain the edge contour of the content object therein. This edge contour is generally generated to adapt to the image boundary of the content object and is irregular. This irregular edge contour is set as the image region corresponding to the content object. Similarly, for other background image contents that are not identified as content objects, they can also be integrated into the same image region and regarded as the same content object. It is not difficult to understand that, since the image region is accurately determined to the actual boundary of the content object, the subsequent stylization processing is more uniform.

In another embodiment, the standard image can be equally divided according to a preset scale, divided into multiple rectangular frames, and each rectangular frame is determined as an image region. The edge contours of these image regions are of course regular. It is more efficient to divide the image region in this way.

Step S7300, stylizing at least one target image region in the multiple image regions to make the standard image a stylized image.

On the basis of determining each image region in the standard image, one or more of the multiple image regions can be used as the target image region according to actual needs, and the image content in the target image region can be stylized. Generally, all image regions in the standard image are stylized by default and are all used as target image regions. In some embodiments, it is also possible to allow the user to specify one or more of the image regions as the target image region for stylization.

There are various ways of stylization processing. For example, a default stylization processing method can be set for application, or the user is allowed to specify a target stylization processing method for application. Further, it may only apply one stylization processing method to the same target image region, or it may flexibly combine multiple stylization processing methods for the same target image region as needed. It may uniformly apply the same stylization processing method to all image regions in the same standard image, or it may apply different stylization processing methods to different image regions in the same standard image.

Different stylization processing methods can obtain different image effects. For example, in one embodiment, the target image region is subjected to a first stylization processing so that the image content therein forms a mosaic effect. Specifically, the first stylization processing is implemented through a first stylization program interface. In the business logic implemented by the program interface, the target image region is further subdivided and cut according to smaller size to obtain multiple small blocks arranged in a staggered manner, and they are filled with colors respectively, so that the entire target image region can still restore the gist of the original image content in the target image region as a whole while presenting a mosaic effect at the same time.

In another embodiment, the target image region is subjected to a second stylization process so that the image content (i.e., the image content) therein presents a single tone and forms a block pixelation effect. Specifically, the second stylization process is implemented through a second stylization program interface. In the business logic implemented by the program interface, the image in the entire target image region is uniformly filled with color so that the entire target image region presents the same color, so that the entire standard image presents multiple color blocks, and a block pixelation effect is obtained.

In another embodiment, the target image region is subjected to a third stylization process so that the edge contour of the image content therein is highlighted and an outline effect is presented. Specifically, the third stylization process is implemented through a third stylization program interface. In the business logic implemented by the program interface, the line width of the edge contour of the target image region is first expanded by a preset width, and then the line width range is uniformly filled with color, and the area within the edge contour range can be removed from the color or uniformly filled with other colors such as black, thereby highlighting the boundaries of each image region in the entire standard image and presenting an outline effect.

In some embodiments, the above multiple stylization processing methods can be flexibly combined to perform corresponding processing on the target image region to obtain a more varied stylized image. For example, the covered area corresponding to the edge contour line in the target image region in the standard image can be processed as an outline effect, and the uncovered area can be processed as a mosaic effect or a block pixelation effect.

It can be seen that, after the target image region(s) in the standard image is stylized, the corresponding stylized image can be obtained. Each model output image in the transformed image material can be converted into a corresponding stylized image one-by-one according to the above process, and these stylized images constitute the stylized image material.

It can be known from the above embodiments that the stylized image in the transformed image material is partitioned according to the preset scales to determine multiple image regions, and the target image region is stylized as needed, so that the corresponding stylized effect can be obtained, and the model output images in the transformed image material are converted into corresponding stylized images to constitute stylized materials, which can be used for the target light screen to play the lighting effect. Among them, the stylized processing of the model output image based on the partition is efficient and can realize secondary creation, and can match the pixel characteristics of the target light screen.

Based on embodiments of the above methods of the present disclosure, the process of determining multiple image regions based on the standard image may include the following.

Step S7210, performing target detection based on the standard image to determine the object image corresponding to each content object in the standard image.

In one embodiment, the standard image is detected with the help of a target detection model to determine the object image corresponding to each content object in the standard image. For example, the target detection model can be a detection model of the Yolo series. After target detection, the window of each content object in the standard image is obtained, and the image of the window area is intercepted as the object image of the corresponding content object.

Step S7220, performing image semantic segmentation based on each object image to obtain the edge contour of the content object(s) belonging to the foreground and the background in each object image.

Further, image semantic segmentation can be performed on each object image with the help of an image segmentation model to obtain a mask composed of each pixel of the content object therein, and the mask indicates whether each pixel belongs to the content object, and the pixel belonging to the content object is the foreground, and the pixel not belonging to the content object is the background, and the edge contours of the foreground and the background are obtained accordingly. It can be seen that the mask actually gives the edge contour of the foreground image, i.e., the content object, and the edge contour of the background image.

The image segmentation model can be selected from a variety of models, such as U-net series models, SAM series models, Mask R-CNN series models, etc. It is not difficult to understand that the edge contour of the content object and the edge contour of the background obtained by image semantic segmentation are generally irregular edge contours because the edge contour of the content object matches the actual image boundary of the content object.

Step S7230, merging the edge contours belonging to the background in each object image to indicate the full image background of the standard image as an independent content object.

When there are multiple content objects in the standard image, there are correspondingly multiple object images, and the corresponding background image is determined in each object image. In this case, the background images in each object image can be regionally merged to determine the edge contour of the full image background in the standard image, and the full image background in the standard image is regarded as an independent content object.

Step S7240, calibrating the image region corresponding to each content object in the standard image according to each edge contour.

At this point, the edge contours of individual content objects in the standard image are obtained, the corresponding relationship between these edge contours and the standard image is established, and the area covered by each edge contour is used as the corresponding image region, so as to realize the calibration of each image region in the standard image.

It can be known from the above embodiments that, after performing target detection on the standard image to obtain each object image, performing image semantic segmentation on each object image, irregular edge contours can be obtained, which truly define the actual boundary of the content object in the standard image and restore the actual area relationship between multiple content objects in the standard image. The image region thus obtained is more targeted and has a more integrated feel when it is stylized. When it is mapped to the display frame of the target light screen, the degree of restoration of the standard image is higher.

Based on embodiments of the above methods of the present disclosure, the process of stylizing the target image region in the multiple image regions to make the standard image a stylized image may include the following.

Step S7311, dividing the target image region into multiple blocks.

The content object in the target image region can be set to one or more small areas corresponding to the scale according to the needs of the mosaic effect presentation, and a finer granularity partition is performed according to these small areas, thereby dividing the target image region into multiple blocks. The specific partitioning method can be a regular partitioning method so that the image layers are arranged in a matrix to obtain a mosaic effect; it can also be a staggered partitioning method so that these blocks are staggered to enhance the mosaic effect. At the same time, the partitioning method can also be set according to the light screen device, that is, it may be determined according to the light source position distribution information of the target light screen. For example, it can be partitioned according to the final splicing shape of the splicing lamp, or it can be partitioned according to the arrangement of the lamp beads of the pixel screen or curtain lamp.

Step S7312, obtaining the average value of the color values of all pixels in each block, and use it as the regional standard color corresponding to the block.

For each block in the target image region, the color values of all pixels in each block can be averaged to measure the hue effect of the image of the block as a whole, and the average value is used as the regional standard color corresponding to the block. Thus, each block obtains a regional standard color that reflects its own hue effect. In some embodiments, the regional standard color can also be detected to determine whether it is lower than a preset threshold. When it is lower than the preset threshold, the regional standard color is increased according to the preset range to obtain a brightening effect, so that the regional standard has a stronger vividness.

Step S7313, setting the color value of each pixel in each block to the regional standard color corresponding to the block to define the mosaic effect of the target image region.

In order to obtain the mosaic effect, the color value of each pixel in each block is further set to the regional standard color corresponding to the block, that is, the color value of each pixel in the block is replaced with the color value corresponding to the regional standard color of the block, that is, the average value disclosed in the previous description. Thus, the target image region can be defined as a mosaic effect.

It is not difficult to understand that, after the stylizing processing corresponding to the mosaic effect, the target image region can still roughly present the original content object in terms of image effect, but the discernible granularity becomes coarser in units of blocks, which is more suitable for mapping to the target light screen for presentation.

On the basis of embodiments of the above methods of the present disclosure, the process of stylizing the target image region in the multiple image regions so that the standard image becomes a stylized image may include the following.

Step S7321, obtaining the average color value of all pixels in the target image region, and using it as the regional standard color of the target image region.

The target area image can also be uniformly colored as a whole, so as to simplify the amount of stylization processing to improve the efficiency of stylization processing, and can also adapt to some light screens with lower resolutions. Thus, for the target image region, the color values of all pixels therein are averaged as the regional standard color of the target image region.

In some embodiments, the regional standard color can also be detected to determine whether it is lower than a preset threshold. When it is lower than the preset threshold, the regional standard color is increased according to a preset range to obtain a brightening effect, so that the regional standard has a stronger vividness.

Step S7322, setting the color value of each pixel in each target image region to the regional standard color corresponding to the target image region to define the block pixelation effect of the target image region.

Similar to the previous embodiments, the color value of each pixel in the target image region is set to the regional standard color corresponding to the target image region, that is, the color value of each pixel in the target image region is replaced by the color value corresponding to the regional standard color of the target image region, that is, the average value disclosed above. As a result, the entire target image region is a large block of the same color, and the corresponding content object is indicated under the outline of its edge contour, thereby defining the block pixelation effect of the target image region.

It is not difficult to understand that uniform coloring is performed on the granularity of the target image region. Although the granularity is coarser, it can match the light screen with a small number of light-emitting units and a low resolution, and can improve the efficiency of stylization processing, reduce the amount of calculation, and be fast and efficient.

On the basis of embodiments of the above methods of the present disclosure, the process of stylizing the target image region in the multiple image regions to make the standard image a stylized image may include the following.

Step S7331, determining the edge contour line and the corresponding coverage area of the target image region with a predetermined line width, where the area enclosed by the edge contour line is regarded as an uncovered area.

Connecting the outermost pixels of the edge contour in the target image region together can form a corresponding edge contour line, and expanding this edge contour line according to the predetermined line width can obtain a thicker edge contour line, which becomes the coverage area of the outer edge of the target image region. When expanding the edge contour line, it can be expanded inward, outward, or both inward and outward at the same time, which can be flexibly set. For the pixel set in the target image region that does not belong to the coverage area, that is, the closed range defined by the edge contour line, it naturally constitutes an uncovered area.

Step S7332, obtaining the average color value of all pixels in the target image region, and using it as the regional standard color of the target image region.

Similarly, the coverage area corresponding to the edge contour line can also be filled with color as a whole, so as to simplify the amount of calculation of stylization processing to improve the efficiency of stylization processing and realize the outline and highlighting of the edge contour line. Therefore, for the coloring of the coverage area corresponding to the edge contour line, the color values of all pixels in the target image region are first averaged as the regional standard color of the target image region.

In some embodiments, the regional standard color can also be detected to determine whether it is lower than a preset threshold. When it is lower than the preset threshold, the regional standard color is increased according to the preset range to obtain a brightening effect, so that the regional standard has a stronger vividness.

Step S7333, setting the color value of each pixel in the coverage area as the regional standard color corresponding to the target image region, and setting the color value of each pixel in the uncovered area as a preset standard color.

Similarly, the color value of each pixel in the coverage area corresponding to the edge contour line is set to the regional standard color corresponding to the target image region, that is, the color value of each pixel in the coverage area is replaced by the color value corresponding to the regional standard color of the target image region, that is, the average value disclosed in the previous description.

For other pixels outside the coverage area that belong to the target image region, that is, the color values of pixels in the uncovered area, they can be set to a preset standard color. The preset standard color can be any color value such as black or white, which can serve to set off the edge contour line.

According to the above embodiments, by expanding the line width of the edge contour line of the target image region, the coverage area corresponding to the line width is filled according to the pixel average value in the target image region, and other uncovered areas are set to the standard color corresponding to the background, which sets off the edge contour line. The edge contour line can also reflect the overall tone of the image in the target image region, thereby achieving stylized processing of the target image region and obtaining an outline effect. Processing in this way also has the advantages of low computational complexity and rapid imaging efficiency, and can be adapted to various light screens, which is more versatile.

On the basis of embodiments of the above methods of the present disclosure, the process of obtaining the stylized image material obtained after the lighting-effect generation model transforms the image media material according to the transformation prompt text may include the following.

Step S8100, obtaining the image media material and transformation prompt text specified by the user;

Both the image media material and the transformation prompt text can be specified by the user. For example, the user can select one or more pictures or videos from the local album of the terminal device as image media materials. Of course, it is also possible to specify an online link to determine the corresponding picture or video as the image media material. The transformation prompt text can be manually entered and submitted by the user, or it can be set by default. When the user submits the image media material, the default transformation prompt text is obtained. In one embodiment, multiple transformation prompt text templates for generating stylized images of various styles are pre-customized, so that the user can select any one of them as the transformation prompt text for application.

Step S8200, importing the image media material and the transformation prompt text into the lighting-effect generation model to obtain the corresponding generated stylized image material, and the lighting-effect generation model is a model obtained by fine-tuning training based on a large language model that has been fully trained, for example, by a third party.

The lighting-effect generation model in one embodiment can be prepared based on fine-tuning training of a large language model. Specifically, the method includes the following steps: first, preparing a training data set, including image media materials and preset transformation prompt text as training samples in the training data set, and providing stylized images corresponding to the indicative semantics contained in the transformation prompt text as supervision samples; then, iteratively calling training samples from the training data set, inputting a third-party fully trained large language model, and generating model product pictures by reasoning; finally, using the supervision samples corresponding to the training samples to calculate the loss value between the model product picture and the supervision sample, and correcting the weight of the large language model according to the loss value, so that the loss value iteratively approaches the preset value or until the number of iterations reaches the preset number, thereby confirming that the large language model has reached a convergence state after fine-tuning training, and using the converged large language model as a lighting-effect generation model. The lighting-effect generation model is supervised by the stylized images corresponding to the training samples during the fine-tuning training of the training data set, so when it reaches a convergence state, it obtains the ability to transform the image media material according to the given transformation prompt text to obtain one or more stylized images. As long as the image media material and the transformation prompt text are given, the model product picture can be directly obtained end-to-end to be used as the stylized image. Of course, these stylized images constitute the image media material outputted by the lighting-effect generation model.

The stylized images in the training data set can be provided in correspondence with the images in the image media material, so that the one-to-one correspondence between the two can be implemented for supervised training, and the lighting-effect generation model can generate a corresponding stylized image for each image in the given image media material. The stylized images in the training data set can be the images disclosed in the previous description, which are suitable for conversion into the lighting-effect control data of the target light screen, so that the lighting-effect control data of the target light screen can be quickly generated according to the stylized images.

According to the above embodiments, it is not difficult to understand that, after the third-party trained large language model continues to be fine-tuned and trained until convergence, it can be used as a lighting-effect generation model. It can complete the creation and stylization processing according to the image media material end-to-end to directly obtain the stylized image material composed of stylized images, which significantly improves the creation efficiency of the stylized images required for the lighting effects. The lighting-effect control data corresponding to the lighting effects can be directly generated according to the stylized images. With the help of the large language model, the efficiency of users in creating lighting effects is greatly improved, and because the image content can be diversified, the stylized image materials required for the lighting effects are also richer, which can optimize the content customization architecture of the light screen device and help to promote and popularize the light screen device.

Based on embodiments of the above methods of the present disclosure, the process of obtaining the image media material and transformation prompt text specified by the user may further include the following.

Step S9100, displaying the image media material setting control, text input area, and submit button in the graphical user interface;

When it is to obtain the image media material and the transformation prompt text, the business logic can be extended to a device with a human-computer interaction function for implementation, such as in a controller that implements the human-computer interaction function, or extended to a terminal device connected to the controller for implementation. With the help of the human-computer interaction function provided by the device, the image media material setting control, text input area, and submit button are displayed in the graphical user interface of the device.

The setting control can be used for users to collect or select image media materials, for example, it can be used for users to call the camera unit to obtain real-life pictures or videos as image media materials, or for users to select pictures or videos as image media materials in the gallery.

The text input area can be used for users to select or enter text as transformation prompt text, and users can also use voice input to generate transformation prompt text.

The submit button is used to trigger a submitting event to determine the image media material and transformation prompt text edited by the user.

Step S9200, in response to the submitting event acting on the submit button, obtaining the image media material specified by the user based on the setting control and the transformation prompt text provided based on the text input area.

When the user completes the setting of the image media material and the transformation prompt text, the corresponding submitting event can be triggered by the submit button. In response to the submitting event, the image media material specified by the user is obtained from the setting control, the transformation prompt text specified by the user is extracted from the text input area, and the image media material and the transformation prompt text are submitted to the lighting-effect generation model to obtain the output of the model.

According to the above embodiments, it can be seen that the lighting effect creation capability can be opened to users based on the human-computer interaction function, so that users can flexibly design richer and higher-quality lighting effects.

On the basis of embodiments of the above methods of the present disclosure, before generating lighting-effect control data matching the target light screen according to the stylized image in the stylized image material, the method also includes the following.

Step S4100, obtaining the light source position distribution information of the target light screen, and constructing an interface canvas according to the light source position distribution information of the target light screen, and displaying the interface canvas to the graphical user interface.

As mentioned above, the light source position distribution information of the target light screen can be obtained in advance, which includes the position information of each light-emitting unit of the target light screen relative to its display frame. According to this position information, the display frame and the distribution of each light-emitting unit therein can be determined, and an interface canvas can be constructed accordingly, so that the interface canvas matches the display frame, and each light-emitting unit therein is regarded as a corresponding basic pixel, so as to be used for adapting the display of the stylized image. After constructing the interface canvas, with the help of the pre-provided human-computer interaction function, the interface canvas is displayed in a graphical user interface, such as a graphical user interface of a controller or a terminal device connected thereto.

Step S4200, adapting and displaying the stylized image in the stylized image material to the interface canvas for user editing.

The user can edit the stylized image in the stylized image material based on the interface canvas so that the stylized image can better match the user's expectation. Accordingly, the user can select the stylized image to be edited from the stylized image material, and adapt the stylized image to the interface canvas for display.

For example, in one embodiment, when the aspect ratio of the stylized image does not match the aspect ratio of the interface canvas, and the stylized image can be cropped according to the aspect ratio of the interface canvas to match the aspect ratio of the stylized image and the interface canvas.

In another embodiment, when the resolution of the stylized image is higher than the resolution of the interface canvas by more than a preset multiple, and the resolution of the stylized image can be appropriately compressed so that the ratio of the resolutions of the stylized image and the interface canvas falls within the preset multiple range.

After completing the matching of the stylized image and the interface canvas, the stylized image can be scaled to the same size as the interface canvas and added to the top layer of the interface canvas for display. The user can edit the stylized image in the interface canvas to achieve functions such as color modification, image enlargement, or image movement. It is not difficult to understand that the editing effect based on this can be conveniently and quickly applied to the stylized image.

Step S4300, in response to the editing submission event acting on the stylized image, the edited stylized image is replaced and updated with the corresponding stylized image in the stylized image material.

When the user completes the editing of each stylized image, the corresponding editing submission event can be triggered in the graphical user interface, and the background program applies the user editing effect to each stylized image to realize the correction of each stylized image, and then replaces the corresponding stylized image in the stylized image material, that is, the original image, with these stylized images, so as to complete the editing of the stylized image material.

According to the above embodiments, the user can perform deep creation on the stylized image material, correct and update the stylized image therein, and in the process of correction and update, the interface canvas is constructed according to the light source position distribution information of the target light screen, and the stylized image is adapted to the interface canvas for display, which is more convenient for the user to accurately edit the stylized image, in a what-you-see-is-what-you-get way, and assists the user to customize a more advantageous lighting effect material.

On the basis of embodiments of the above methods of the present disclosure, before generating the lighting-effect control data matching the target light screen according to the stylized image in the stylized image material, the method may further include the following.

Step S4100, obtaining the light source position distribution information of the target light screen, where the light source position distribution information includes the position information of each light-emitting unit in the target light screen determined by referring to the display frame of the target light screen.

The light source position distribution information of the target light screen can also be used to generate a lighting effect data template, so that, after obtaining the light source position distribution information in advance, the template can be directly called back.

Step S4200, generating the lighting effect data template corresponding to the target light screen according to the light source position distribution information, where the lighting effect data template includes the lighting parameter attribute items of each light-emitting unit in the target light screen;

Since the light source position distribution information includes the position information of each light-emitting unit in the target light screen determined by referring to the display frame of the target light screen, that is, the number of lamp beads, the density of lamp beads, and the arrangement of lamp beads, etc., each light-emitting unit and its lighting parameter attribute item can be used as a data record, constructed as a two-dimensional data list. This data list can be constructed as a lighting effect data template. When constructing the data list, the order of the data records corresponding to each light-emitting unit can be arranged according to the order of each light-emitting unit on the signal transmission link, so as to facilitate the organization of the data of each light-emitting parameter attribute item according to the order of each light-emitting unit in the signal transmission link.

Step S4300, the lighting effect data template is mapped with the target light screen and stored in the memory for future use.

After determining the lighting effect data template, the lighting effect data template can be mapped with the target light screen and stored in the controller. When the controller needs to generate its corresponding lighting-effect control data according to the stylized image, the lighting effect data template is directly called to encapsulate the lighting-effect control data.

According to the above embodiments, a lighting effect data template is constructed in advance according to the light source position distribution information. The lighting effect data template provides convenience for converting each stylized image into the corresponding lighting-effect control data, and can improve the efficiency of converting the corresponding lighting-effect control data according to the stylized image.

Based on embodiments of the above methods of the present disclosure, the process of generating the lighting-effect control data matching the target light screen according to the stylized image in the stylized image material may include the following.

Step S5210, extracting the stylized image from the stylized image material.

When it is necessary to play the lighting effect according to the stylized image material, each stylized image in the stylized image material can be regarded as a lighting effect image frame and played one-by-one. Accordingly, each stylized image in the stylized image material can be extracted first, added to an image queue, and dequeued in sequence, and lighting-effect control data matching the target light screen is generated for each dequeued stylized image.

Step S5220, according to the color value of each pixel in the stylized image, determining the lighting parameter attribute item of the lighting unit corresponding to each pixel in the lighting effect data template, and obtaining the lighting-effect control data corresponding to each stylized image.

When it is to generate the corresponding lighting control data for a stylized image, the conversion is performed according to the correspondence between the pixels in the stylized image and the light-emitting units in the display frame of the target light screen. When the resolution of the stylized image and the resolution of the display frame are multiples, the multiples are also correspondingly adjusted. Therefore, the number of pixels in the stylized image and the number of light-emitting units in the display frame may be a many-to-one relationship. When there is a many-to-one relationship, the color values of multiple pixels can be averaged as the color value of the corresponding light-emitting unit. When the pixels in the stylized image correspond to the light-emitting units in the display frame one-by-one, the color value of the pixel can be directly set as the color value of the light-emitting unit.

After constructing the lighting effect data template according to the light source position distribution information of the target light screen, it can directly assign the color value determined according to the pixels of the stylized image to the light-emitting parameter attribute item of the corresponding light-emitting unit in the lighting effect data template according to the above correspondence relationship, so as to complete the setting of the color value of the corresponding light-emitting unit and form the control data for controlling the light emission of the corresponding light-emitting unit.

When each light-emitting unit on the lighting effect data template has completed the data setting of its light-emitting parameter attribute items, each data record in the lighting effect data template can be encapsulated into lighting-effect control data according to the communication protocol between the controller and the target light screen, such as the serial communication protocol. The lighting-effect control data actually plays the role of a lighting-effect playback instruction, and is transmitted to the target light screen. Each light-emitting unit in the target light screen can obtain its own control data from the lighting-effect control data, obtain the color value therein, and control its own light-emitting element to emit the corresponding color light. Each light-emitting unit emits the color light corresponding to its control data, and the target light screen can display the corresponding picture effect of the stylized image in its entire display frame. By playing the corresponding frame effects according to each stylized image in turn, an animation effect can be presented on the display frame of the target light screen.

It can be seen from the above embodiments that, when generating corresponding lighting-effect control data for each stylized image based on the lighting effect data template, the color setting speed is faster and the color setting is accurate. For a controller using a lower-cost embedded chip, it not only has the efficiency advantage in computing resources, but also has the economic advantage in cost.

Figure 5:
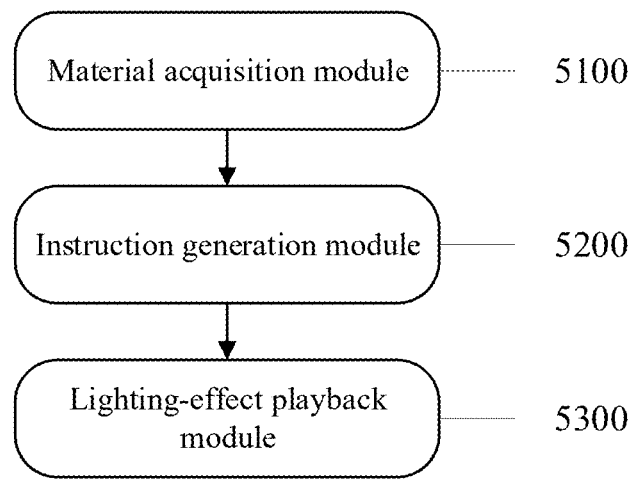
FIG. 5 illustrates a structural diagram of a lighting-effect generating device according to an embodiment of the present disclosure.

FIG. 5 illustrates a structural diagram of a lighting-effect generating device according to an embodiment of the present disclosure. As shown in FIG. 5, the lighting-effect generating device includes a material acquisition module 5100, an instruction generation module 5200, and a lighting-effect playback module 5300, etc.

The material acquisition module 5100 is configured to obtain a stylized image material obtained after the lighting-effect generation model transforms the image media material according to the transformation prompt text, and the stylized image material includes at least one stylized image. The instruction generation module 5200 is configured to generate lighting-effect control data matching the target light screen according to the stylized image in the stylized image material. The lighting-effect playback module 5300 is configured to control the target light screen to play the corresponding lighting effect according to the lighting-effect control data.

Further, the material acquisition module 5100 may include: a data acquisition module configured to acquire the image media material and transformation prompt text specified by the user; a simple reasoning module configured to import the image media material and transformation prompt text into the lighting-effect generation model to obtain the corresponding generated transformed image material, where the transformed image material includes at least one model output image, and the lighting-effect generation model is a large language model fully trained by a third party; a transformation processing module configured to take the model output image in the transformed image material as a unit, and perform stylization processing on each model output image to obtain a corresponding stylized image; and a product construction module configured to construct each of the stylized images into a stylized image material for application.

Further, the transformation processing module may include: an image compression module configured to compress each model output image in the transformed image material to a preset scale to obtain a standard image; an image partitioning module configured to determine multiple image regions based on the standard image, where the image region has a regular or irregular edge contour; and a style shaping module configured to perform stylization processing on a target image region among the multiple image regions to make the standard image a stylized image.

Further, the image partitioning module may include: a target detection module configured to perform target detection on the standard image to determine the object image corresponding to each content object therein; an image segmentation module configured to perform image semantic segmentation based on each object image to obtain the content object belonging to the foreground and the edge contour belonging to the background in each object image; a background merging module configured to merge the edge contours belonging to the background in each object image to indicate the full image background of the standard image as an independent content object; and a region calibration module configured to calibrate the image region corresponding to each content object in the standard image according to each edge contour.

Further, the style shaping module may include at least one of the following functional modules: a first functional module configured to perform a first stylization process on the target image region to form a mosaic effect for the image content therein; a second functional module configured to perform a second stylization process on the target image region to make the image content therein present a single tone and form a block pixelation effect; and a third functional module configured to perform a third stylization process on the target image region to make the edge contour of the image content therein stand out and present an outline effect.

Further, the style shaping module may also include: a block segmentation module configured to divide the target image region into multiple blocks; a block color determining module configured to obtain the average color value of all pixels in each block and use it as the regional standard color corresponding to the block; a block color setting module configured to set the color value of each pixel in each block to the regional standard color corresponding to the block, so as to define the mosaic effect of the target image region.

Further, the style shaping module may also include: an object color determining module configured to obtain the average color value of all pixels in the target image region and use it as the regional standard color of the target image region; and an object color setting module configured to set the color value of each pixel in each target image region to the regional standard color corresponding to the target image region, so as to define the block pixelation effect of the target image region.

Further, the style shaping module may also include: a contour extraction module configured to determine the edge contour line and the corresponding coverage area of the target image region with a predetermined line width, and the area enclosed by the edge contour line is used as the uncovered area; an object color determining module configured to obtain the average color value of all pixels in the target image region and use it as the regional standard color of the target image region; and a full image color setting module configured to set the color value of each pixel in the coverage area to the regional standard color corresponding to the target image region, and set the color value of each pixel in the uncovered area to a preset standard color.

Based on embodiments of the above devices of the present disclosure, the material acquisition module 5100 may include: a data acquisition module configured to obtain the image media material and transformation prompt text specified by the user; a deep reasoning module configured to import the image media material and transformation prompt text into the lighting-effect generation model to obtain the corresponding generated stylized image material, and the lighting-effect generation model is a model obtained by fine-tuning training based on a large language model trained by a third party.

Further, the data acquisition module may include: an interface display module configured to display an image media material setting control, a text input area, and a submit button in a graphical user interface; and a submit response module configured to respond to a submitting event acting on the submit button, and obtain the image media material specified by the user based on the setting control and the transformation prompt text provided based on the text input area.

On the basis of embodiments of the above devices of the present disclosure, prior to the operation of the instruction generation module 5200, the present disclosure also provide a lighting-effect generation module, which may include: a canvas display module configured to obtain the light source position distribution information of the target light screen, and construct an interface canvas according to the light source position distribution information of the target light screen, and display the interface canvas to the graphical user interface; a picture display module configured to adapt and display the stylized image in the stylized image material to the interface canvas for user editing; and an editing response module configured to respond to an editing submission event acted on the stylized image, and replace the edited stylized image with the corresponding stylized image in the stylized image material.

On the basis of embodiments of the above devices of the present disclosure, prior to the operation of the instruction generation module 5200, the lighting-effect generation module may further include: a layout acquisition module configured to acquire the light source position distribution information of the target light screen, the light source position distribution information including the position information of each light-emitting unit in the target light screen determined with reference to the display frame of the target light screen; a template generation module configured to generate a lighting effect data template corresponding to the target light screen according to the light source position distribution information, the lighting effect data template including the lighting parameter attribute items of each light-emitting unit in the target light screen; and a template storage module configured to map the lighting effect data template with the target light screen and store them in a memory for future use.

On the basis of embodiments of the above devices of the present disclosure, the lighting-effect generation module may also include: an image extraction module configured to extract a stylized image from the stylized image material; and an instruction encapsulation module configured to determine the lighting parameter attribute items of the light-emitting unit corresponding to each pixel in the lighting effect data template according to the color value of each pixel in the stylized image, and obtain the lighting-effect control data corresponding to each stylized image.

Figure 6:
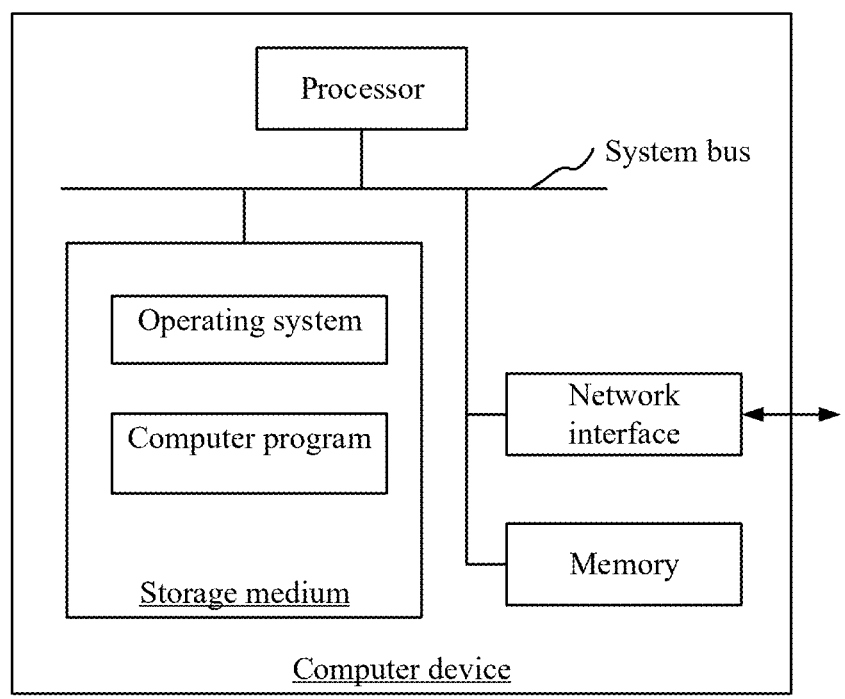
FIG. 6 illustrates a structural diagram of a computer device according to an embodiment of the present disclosure.

Based on the above embodiments of the present disclosure, referring to FIG. 6, another embodiment of the present disclosure further provides a computer device, and the computer device may implement the controller in the above described light screen device. As shown in FIG. 6, which is a schematic diagram of the internal structure of the computer device, the computer device includes at least one processor, a computer-readable storage medium, a memory, and a network interface connected via a system bus. Among them, the computer-readable storage medium of the computer device stores an operating system, a database and computer-readable instructions, and the database may store a control information sequence. When the computer-readable instructions are executed by the processor, the processor can implement a lighting-effect generating method. The processor of the computer device is used to provide computing and control capabilities to support the operation of the entire computer device. The memory of the computer device may store computer-readable instructions, and when the computer-readable instructions are executed by the processor, the processor can execute the lighting-effect generating method of the present disclosure. The network interface of the computer device is used to connect and communicate with the terminal device. It can be understood by those skilled in the art that the structure shown in FIG. 6 is only a block diagram of a partial structure related to the present disclosure, and does not constitute any limitation on the computer device to which the present disclosure may be applied. The specific computer device may include more or fewer components than shown in the figure, or may combine certain components, or have different component arrangements.

In one embodiment, the processor may be used to execute the specific functions of each module and its submodules in FIG. 5, and the memory stores the program code and various types of data required to execute the above modules or submodules. The network interface is used for data transmission to and from user terminals or servers, or inside the ambient lamp. The memory in one embodiment stores the program code and data required to execute all modules/submodules in the lighting-effect generating device of the present disclosure, and the server can call the program code and data of the server to execute the functions of all submodules.

The present disclosure also provides a storage medium storing non-transitory computer-readable instructions. When the computer-readable instructions are executed by one or more processors, one or more processors may execute the steps of the lighting-effect generating method described in any embodiment of the present disclosure.

The present disclosure also provides a computer program product, including a computer program/instructions. When the computer program/instructions is executed by one or more processors, the steps of the lighting-effect generating method described in any embodiment of the present disclosure are implemented.

A person skilled in the art can understand that the implementation of all or part of the processes in the above-mentioned embodiment method of the present disclosure can be completed by instructing the relevant hardware through a computer program. The computer program can be stored in a computer-readable storage medium. When the computer program is executed, it can include the processes of the embodiments of the above-mentioned methods. Among them, the aforementioned storage medium can be a computer-readable storage medium such as a disk, an optical disk, a read-only memory (ROM), or a random access memory (RAM).

The above describes examples of implementation of the present disclosure. It should be pointed out that for those skilled in the art, without departing from the principle of the present disclosure, improvements and modifications can be made, and these improvements and modifications should also be regarded as within the scope of the present disclosure.

Accordingly, the present disclosure transforms the image media material according to the transformation prompt text with the help of the lighting-effect generation model to obtain a stylized image, plays the corresponding lighting effect according to the stylized image, realizes the intelligent creation of the lighting effect of the light screen device, optimizes the product use experience of the light screen device, and contributes to the promotion of the light screen device.

What is claimed is:

1. A lighting-effect generating method for a light screen device, comprising:
    obtaining stylized image material after a lighting-effect generation model transforms image media material according to a transformation prompt text, the stylized image material including at least one stylized image;
    acquiring light source position distribution information of a target light screen, wherein the light source position distribution information includes position information of each light-emitting unit in the target light screen determined by referring to a display frame of the target light screen;
    generating a lighting effect data template corresponding to the target light screen according to the light source position distribution information, wherein the lighting effect data template includes lighting parameter attribute items of each light-emitting unit in the target light screen;
    mapping the lighting effect data template with the target light screen and storing the lighting effect data template in a memory for callback;
    generating lighting-effect control data matching the target light screen according to the stylized image in the stylized image material; and
    controlling the target light screen to play a corresponding lighting effect according to the lighting-effect control data,
    wherein the generating lighting-effect control data matching the target light screen according to the stylized image in the stylized image material further includes: extracting the stylized image from the stylized image material; and determining the lighting parameter attribute items of the light-emitting unit corresponding to each pixel in the lighting effect data template according to color value of each pixel in the stylized image, and obtaining the lighting-effect control data corresponding to the stylized image.

2. The lighting-effect generating method according to claim 1, wherein the obtaining stylized image material after a lighting-effect generation model transforms image media material according to a transformation prompt text further includes:
    acquiring the image media material and transformation prompt text specified by a user;
    importing the image media material and transformation prompt text into the lighting-effect generation model to obtain corresponding transformed image material, wherein the transformed image material includes at least one model output image, and the lighting-effect generation model is a large language model trained by a third party;
    taking the model output image in the transformed image material as a unit, and stylizing each model output image to obtain the corresponding stylized image; and
    constructing the at least one stylized image into a separate stylized image material for callback.

3. The lighting-effect generating method according to claim 2, wherein the taking the model output image in the transformed image material as a unit, and stylizing each model output image to obtain the corresponding stylized image further includes:
   compressing each model output image in the transformed image material to a preset scale to obtain a standard image;
   determining multiple image regions in the standard image based on the standard image, wherein the image regions have regular or irregular edge contours; and
   stylizing at least one target image region in the multiple image regions to make the standard image a stylized image.

4. The lighting-effect generating method according to claim 3, wherein the determining multiple image regions in the standard image based on the standard image further includes:
   performing target detection on the standard image to determine an object image corresponding to each content object in the standard image;
   performing image semantic segmentation on each object image to obtain content objects belonging to foreground and edge contours belong to background in each object image;
   merging the edge contours belonging to the background in the object images into a full image background of the standard image to be indicated as an independent content object; and
   calibrating the image region corresponding to each content object in the standard image according to each edge contour.

5. The lighting-effect generating method according to claim 3, wherein the stylizing at least one target image region in the multiple image regions further includes at least one of:
   performing a first stylization processing on the target image region, such that image content in the target image region forms a mosaic effect;
   performing a second stylization processing on the target image region, such that the image content in the target image region presents a single tone and forms a block pixelation effect; and
   performing a third stylization processing on the target image region, such that edge contour of the image content in the target image region is highlighted and presents an outline effect.

6. The lighting-effect generating method according to claim 3, wherein the stylizing at least one target image region in the multiple image regions to make the standard image a stylized image further includes:
   dividing the target image region into multiple blocks;
   obtaining the average color value of all pixels in each block, and using the average value as a regional standard color corresponding to the block; and
   setting the color value of each pixel in each block to the regional standard color corresponding to the block to define a mosaic effect of the target image region.

7. The lighting-effect generating method according to claim 3, wherein the stylizing at least one target image region in the multiple image regions to make the standard image a stylized image further includes:
   obtaining an average color value of all pixels in the target image region, and using the average color value as a regional standard color of the target image region; and
   setting a color value of each pixel in the target image region to the regional standard color corresponding to the target image region to define a block pixelation effect of the target image region.

8. The lighting-effect generating method according to claim 3, wherein the stylizing at least one target image region in the multiple image regions to make the standard image a stylized image further includes:
   determining an edge contour line and a corresponding coverage area of the target image region with a predetermined line width, wherein an area enclosed by the edge contour line is regarded as an uncovered area;
   obtaining an average color value of all pixels in the target image region, and using the average color value as a regional standard color of the target image region; and
   setting a color value of each pixel in the coverage area as a regional standard color corresponding to the target image region, and setting a color value of each pixel in the uncovered area to a preset standard color.

9. The lighting-effect generating method according to claim 1, wherein the obtaining stylized image material after a lighting-effect generation model transforms image media material according to a transformation prompt text further includes:
   obtaining the image media material and the transformation prompt text specified by the user; and
   importing the image media material and the transformation prompt text into the lighting-effect generation model to obtain the stylized image material, and the lighting-effect generation model is a model obtained by fine-tuning and training based on a large language model trained by a third party.

10. The lighting-effect generating method according to claim 1, wherein, before generating lighting-effect control data matching a target light screen according to the stylized image in the stylized image material, the method further comprises:
   acquiring light source position distribution information of the target light screen, and constructing an interface canvas according to the light source position distribution information of the target light screen, and displaying the interface canvas to a graphical user interface;
   adapting and displaying the stylized image in the stylized image material to the interface canvas for user editing; and
   in response to an edit submission event acting on the stylized image, replacing and updating a corresponding stylized image in the stylized image material with an edited stylized image.

11. A light screen device, comprising:
   a central processing unit, and a memory, wherein the central processing unit is configured to execute a computer program stored in the memory to perform a lighting-effect generating method, and the method comprises:
   obtaining stylized image material after a lighting-effect generation model transforms image media material according to a transformation prompt text, the stylized image material including at least one stylized image;
   acquiring light source position distribution information of a target light screen, wherein the light source position distribution information includes position information of each light-emitting unit in the target light screen determined by referring to a display frame of the target light screen;
   generating a lighting effect data template corresponding to the target light screen according to the light source position distribution information, wherein the lighting effect data template includes lighting parameter attribute items of each light-emitting unit in the target light screen;

mapping the lighting effect data template with the target light screen and storing the lighting effect data template in a memory for callback;

generating lighting-effect control data matching the target light screen according to the stylized image in the stylized image material; and controlling the target light screen to play a corresponding lighting effect according to the lighting-effect control data, wherein the generating lighting-effect control data matching the target light screen according to the stylized image in the stylized image material further includes: extracting the stylized image from the stylized image material; and determining the lighting parameter attribute items of the light-emitting unit corresponding to each pixel in the lighting effect data template according to color value of each pixel in the stylized image, and obtaining the lighting-effect control data corresponding to the stylized image.

12. The light screen device according to claim 11, wherein the obtaining stylized image material after a lighting-effect generation model transforms image media material according to a transformation prompt text further includes:

acquiring the image media material and transformation prompt text specified by a user;

importing the image media material and transformation prompt text into the lighting-effect generation model to obtain corresponding transformed image material, wherein the transformed image material includes at least one model output image, and the lighting-effect generation model is a large language model trained by a third party;

taking the model output image in the transformed image material as a unit, and stylizing each model output image to obtain the corresponding stylized image; and constructing the at least one stylized image into a separate stylized image material for callback.

13. The light screen device according to claim 12, wherein the taking the model output image in the transformed image material as a unit, and stylizing each model output image to obtain the corresponding stylized image further includes:

compressing each model output image in the transformed image material to a preset scale to obtain a standard image;

determining multiple image regions in the standard image based on the standard image, wherein the image regions have regular or irregular edge contours; and stylizing at least one target image region in the multiple image regions to make the standard image a stylized image.

14. The light screen device according to claim 13, wherein the determining multiple image regions in the standard image based on the standard image further includes:

performing target detection on the standard image to determine an object image corresponding to each content object in the standard image;

performing image semantic segmentation on each object image to obtain edge contours of content objects belonging to foreground and background in each object image;

merging the edge contours belonging to the background in the object images into a full image background of the standard image to be indicated as an independent content object; and calibrating the image region corresponding to each content object in the standard image according to each edge contour.

15. The light screen device according to claim 13, wherein the stylizing at least one target image region in the multiple image regions further includes at least one of:

performing a first stylization processing on the target image region, such that image content in the target image region forms a mosaic effect;

performing a second stylization processing on the target image region, such that the image content in the target image region presents a single tone and forms a block pixelation effect; and performing a third stylization processing on the target image region, such that edge contour of the image content in the target image region is highlighted and presents an outline effect.

16. The light device according to claim 13, wherein the stylizing at least one target image region in the multiple image regions to make the standard image a stylized image further includes:

dividing the target image region into multiple blocks;

obtaining the average color value of all pixels in each block, and using the average value as a regional standard color corresponding to the block; and setting the color value of each pixel in each block to the regional standard color corresponding to the block to define a mosaic effect of the target image region.

17. The light screen device according to claim 11, wherein the obtaining stylized image material after a lighting-effect generation model transforms image media material according to a transformation prompt text further includes:

obtaining the image media material and the transformation prompt text specified by the user; and importing the image media material and the transformation prompt text into the lighting-effect generation model to obtain the stylized image material, and the lighting-effect generation model is a model obtained by fine-tuning and training based on a large language model trained by a third party.

18. The light screen device according to claim 11, wherein, before generating lighting-effect control data matching a target light screen according to the stylized image in the stylized image material, the method further comprises:

acquiring light source position distribution information of the target light screen, and constructing an interface canvas according to the light source position distribution information of the target light screen, and displaying the interface canvas to a graphical user interface;

adapting and displaying the stylized image in the stylized image material to the interface canvas for user editing; and in response to an edit submission event acting on the stylized image, replacing and updating a corresponding stylized image in the stylized image material with an edited stylized image.

19. A non-transitory computer-readable storage medium storing a computer program including computer-readable instructions for, when executed a computer, performing a lighting-effect generating method for a light screen device, and the method comprising:

obtaining stylized image material after a lighting-effect generation model transforms image media material according to a transformation prompt text, the stylized image material including at least one stylized image;

acquiring light source position distribution information of a target light screen, wherein the light source position distribution information includes position information of each light-emitting unit in the target light screen determined by referring to a display frame of the target light screen;

generating a lighting effect data template corresponding to the target light screen according to the light source position distribution information, wherein the lighting effect data template includes lighting parameter attribute items of each light-emitting unit in the target light screen;

mapping the lighting effect data template with the target light screen and storing the lighting effect data template in a memory for callback;

generating lighting-effect control data matching the target light screen according to the stylized image in the stylized image material; and controlling the target light screen to play a corresponding lighting effect according to the lighting-effect control data, wherein the generating lighting-effect control data matching a target light screen according to the stylized image in the stylized image material further includes: extracting the stylized image from the stylized image material; and determining the lighting parameter attribute items of the light-emitting unit corresponding to each pixel in the lighting effect data template according to color value of each pixel in the stylized image, and obtaining the lighting-effect control data corresponding to the stylized image.

20. The non-transitory computer-readable storage medium according to claim 19, wherein the obtaining stylized image material after a lighting-effect generation model transforms image media material according to a transformation prompt text further includes:

acquiring the image media material and transformation prompt text specified by a user;

importing the image media material and transformation prompt text into the lighting-effect generation model to obtain corresponding transformed image material, wherein the transformed image material includes at least one model output image, and the lighting-effect generation model is a large language model trained by a third party;

taking the model output image in the transformed image material as a unit, and stylizing each model output image to obtain the corresponding stylized image; and constructing the at least one stylized image into a separate stylized image material for callback.

* * * * *